US011965641B2

(12) United States Patent
Rizzo

(10) Patent No.: US 11,965,641 B2
(45) Date of Patent: Apr. 23, 2024

(54) TWIST-LOCK MOUNTING SYSTEM FOR LIGHTING FIXTURES

(71) Applicant: Ryden Richard Rizzo, Sea Cliff, NY (US)

(72) Inventor: Ryden Richard Rizzo, Sea Cliff, NY (US)

( * ) Notice: Subject to any disclaimer, the term of this patent is extended or adjusted under 35 U.S.C. 154(b) by 0 days.

(21) Appl. No.: 18/449,905

(22) Filed: Aug. 15, 2023

(65) Prior Publication Data

US 2024/0068646 A1 Feb. 29, 2024

Related U.S. Application Data

(60) Provisional application No. 63/373,805, filed on Aug. 29, 2022.

(51) Int. Cl.

| | |
|---|---|
| ***F21V 21/02*** | (2006.01) |
| ***F21S 8/00*** | (2006.01) |
| ***F21S 8/04*** | (2006.01) |

(52) U.S. Cl.

CPC .............. *F21V 21/02* (2013.01); *F21S 8/036* (2013.01); *F21S 8/043* (2013.01)

(58) Field of Classification Search

CPC . F21V 21/02; F21V 21/04; F21S 8/036; F21S 8/043

See application file for complete search history.

(56) References Cited

U.S. PATENT DOCUMENTS

| | | | | |
|---|---|---|---|---|
| D271,655 | S | 12/1983 | Numbers | |
| 5,867,583 | A | 2/1999 | Hazelwood et al. | |
| 6,979,108 | B1 * | 12/2005 | Berge | F21V 23/06 362/147 |
| 9,702,533 | B1 | 7/2017 | Harpenau et al. | |
| 10,168,029 | B1 * | 1/2019 | Hsu | F21S 8/043 |
| 11,236,890 | B2 | 2/2022 | Feit et al. | |
| 2013/0208489 | A1 | 8/2013 | Schmuckle | |
| 2017/0009962 | A1 * | 1/2017 | Feit | E04B 9/006 |
| 2019/0285259 | A1 * | 9/2019 | Tickner | F21V 23/06 |

FOREIGN PATENT DOCUMENTS

| | | | | |
|---|---|---|---|---|
| CN | 104359057 A | * | 2/2015 | F21S 8/043 |
| CN | 110645513 A | * | 1/2020 | |

* cited by examiner

*Primary Examiner* — Mariceli Santiago

(57) ABSTRACT

A twist-lock mounting system for lighting fixtures includes a mounting plate and a canopy cover. The mounting plate that is secured to a junction box includes a plate body, a first wing, and a second wing. The canopy cover that encloses the electrical wire and electrical connections includes a cover body and a track channel. The first wing and the second wing are laterally connected to the plate body. The first wing is diametrically opposed to the second wing about the plate body. The track channel is perimetrically connected around the cover body. The first wing and the second wing are inserted into the track channel via a pair of access gaps and slidably engaged within the track channel. As a result, the track channel and the cover body are able to enclose the plate body, the first wing, and the second wing.

18 Claims, 7 Drawing Sheets

TWIST-LOCK MOUNTING SYSTEM FOR LIGHTING FIXTURES

FIELD OF THE INVENTION

The present invention generally relates lighting fixtures that require a mounting plate to secure the lighting fixtures to a ceiling. The present invention is a twist-lock mounting system for lighting fixtures that hides mounting screws.

BACKGROUND OF THE INVENTION

Within a room, many opt for lighting to be provided by way of a hanging light fixture or a ceiling mounted light fixture. Additionally, lights fixtures such as sconces can be hung from a wall to provide ambient light in a sitting room such as a library. When light fixtures are affixed to the ceiling or wall, a junction box is mounted behind the dry wall to houses the electrical wiring. A mounting plate is then attached to the junction box via screws as mounting plates come in different sizes to accommodate different types of light fixtures. The canopy cover that encloses the wirings of the light fixture can then be mounted to the mounting plate after the electrical connections are completed. Generally, the canopy cover is attached to the mounting plate with decorative screws to improve the esthetic appearance. However, these decorative screws can damage or strip electrical wires that are housed within the canopy cover thus creating a fire hazard.

An object of the present invention is to provide a twist-lock mounting system for lighting fixtures that eliminates the usage of the decorative screws between the canopy cover and the mounting plate. More specifically, a canopy cover of the present invention is slidably engaged to a mounting plate of the present invention without utilizing any visible decorative screws. Furthermore, the canopy cover is secured to the mounting plate via a set screw to keep the canopy cover from twisting and being dislodged from the mounting plate.

DETAIL DESCRIPTIONS OF THE INVENTION

All illustrations of the drawings are for the purpose of describing selected versions of the present invention and are not intended to limit the scope of the present invention.

Figure 1:
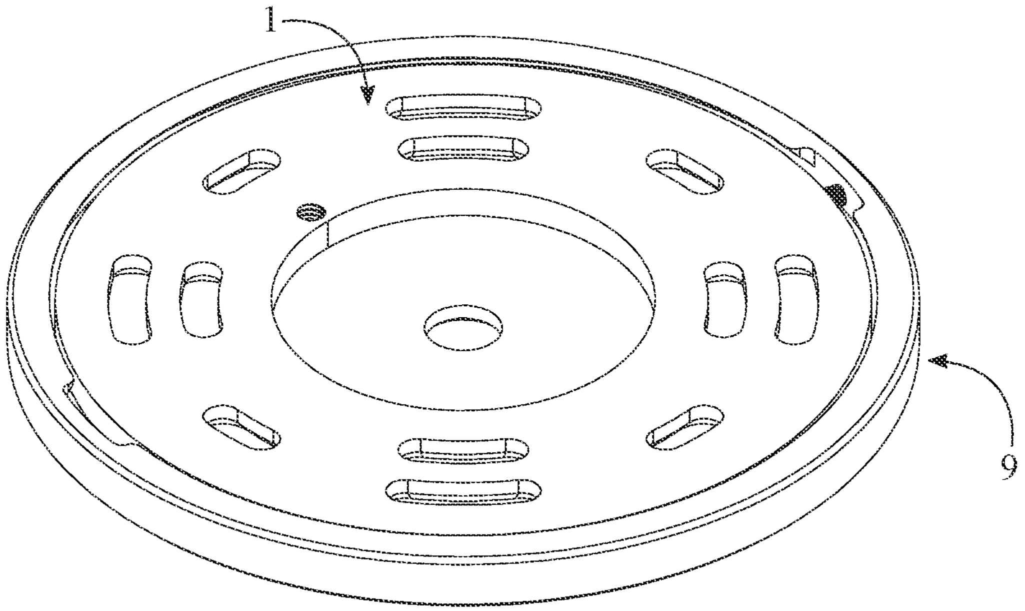
FIG. 1 is a top perspective view of the present invention.
Figure 2:
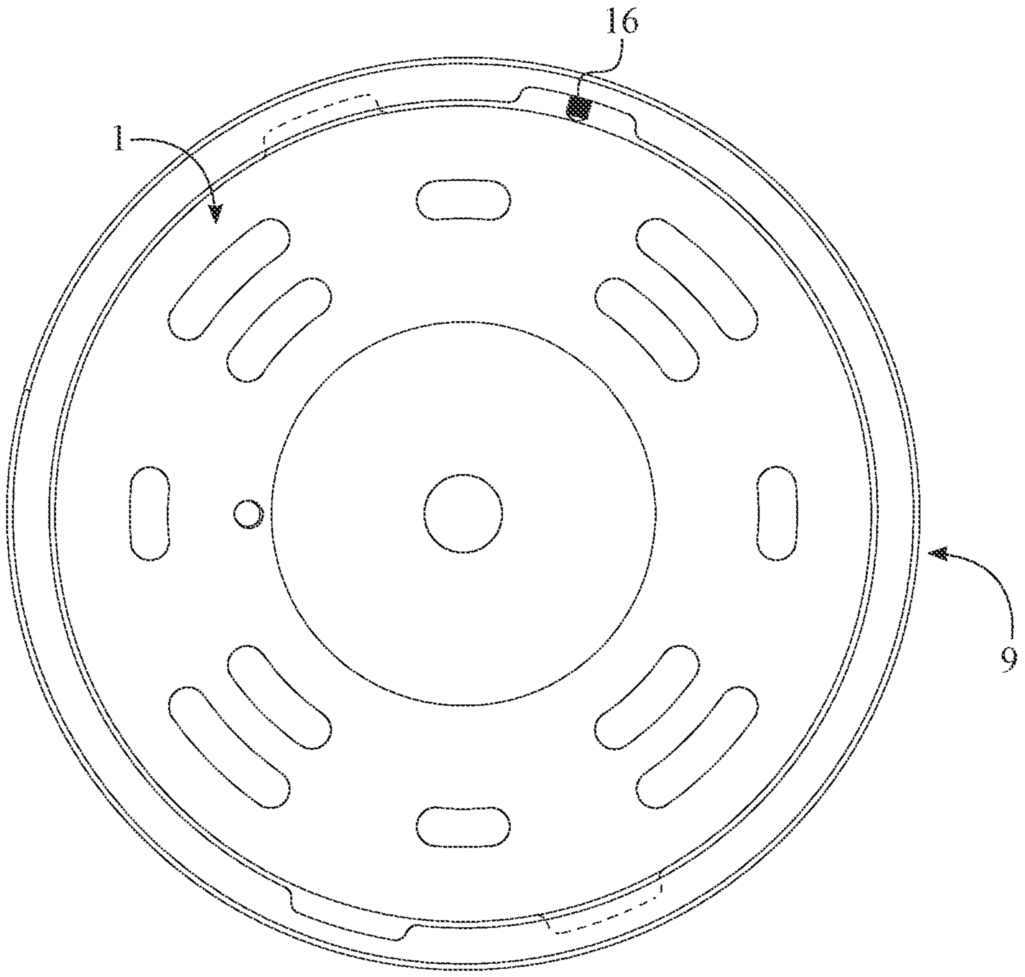
FIG. 2 is a top view of the present invention.

The present invention is a twist-lock mounting system for lighting fixtures as the object of the present invention is to prevent accidental electrical wire damage or stripping. The accomplish the objective, the present invention comprises a mounting plate 1 and a canopy cover 9 as shown in FIG. 1-2. Configuration of the mounting plate 1 and the canopy cover 9 allows the user safely to secure a lighting fixture to a flat surface. More specifically, the mounting plate 1 is attached to an existing junction box that houses the electrical wires via threaded fasteners. Then, the canopy cover 9 can be engaged and rotatably secured to the mounting plate 1 without utilizing any fasteners or mounting screws.

The mounting plate 1 is preferably shaped into a circular shape. However, the mounting plate 1 can be made into any shape as long as the mounting plate 1 can be attached to the existing junction boxes according to the industry standards and regulations. In reference to FIG. 3-4, the mounting plate 1 comprises a plate body 2, a first wing 5, and a second wing 6. More specifically, the plate body 2 functions as the central platform so that the rest of the components can be connected or integrated. The first wing 5 and the second wing 6 are laterally connected to the plate body 2 and outwardly oriented from the plate body 2. In other words, the first wing 5 is outwardly connected to an outer lateral surface 3 of the plate body 2. The second wing 6 is outwardly connected to the outer lateral surface 3 of the plate body 2. Furthermore, the first wing 5 is diametrically opposed to the second wing 6 about the plate body 2 so that the first wing 5 and the second wing 6 are able to function as symmetrical positioned interlocking-arms that engage with the canopy cover 9.

Figure 5:
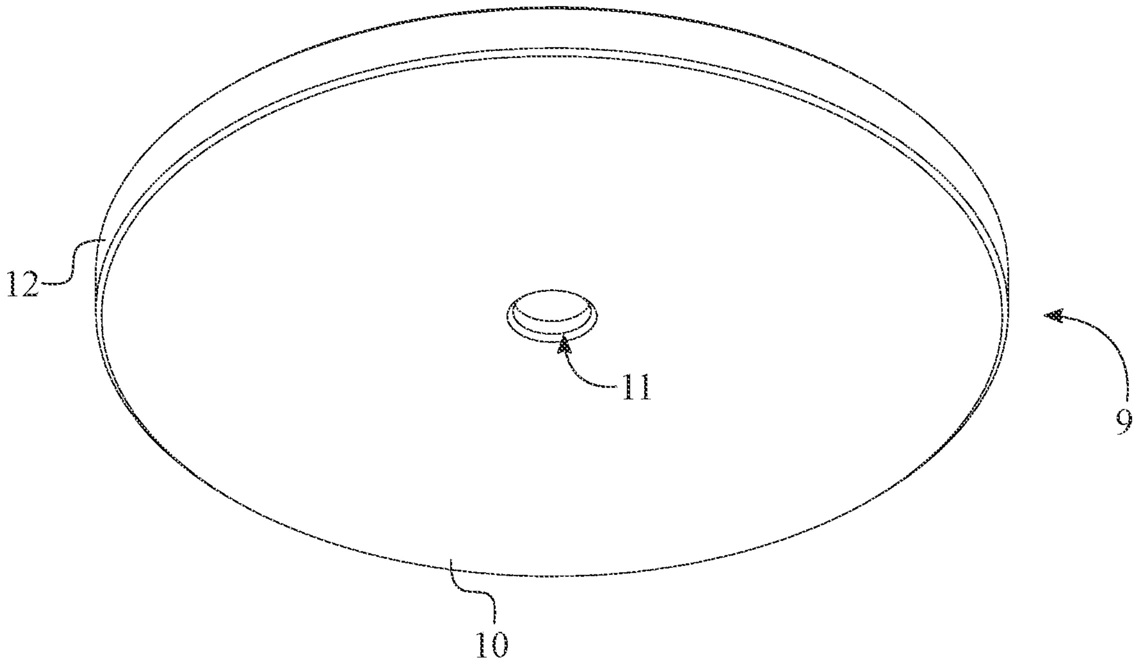
FIG. 5 is a bottom view of the canopy cover of the present invention.

In canopy cover 9 is preferably shaped into a circular shape. However, the canopy cover 9 can be made into any other shapes as long as the canopy cover 9 is designed to be the same shape as the mounting plate 1. In reference to FIG. 3 and FIG. 5-6, the canopy cover 9 comprises a cover body 10 and a track channel 12. The canopy cover 9 functions as the central enclosure that covers the mounting plate 1. The track channel 12 functions as the interlocking rim that engages with the first wing 5 and the second wing 6 as the track channel 12 is perimetrically connected around the cover body 10. When the canopy cover 9 is attached to the mounting plate 1, the first wing 5 and the second wing 6 are engaged within the track channel 12 thus enabling the track channel 12 and the cover body 10 to enclose the plate body 2, the first wing 5, and the second wing 6.

Even though the preferred embodiment only utilizes the first wing 5 and second wing 6 to engage with the canopy cover 9, it is understood that the present invention can use any number of wings to engage with the canopy cover 9 and not limited only for the first wing 5 and second wing 6.

Figure 4:
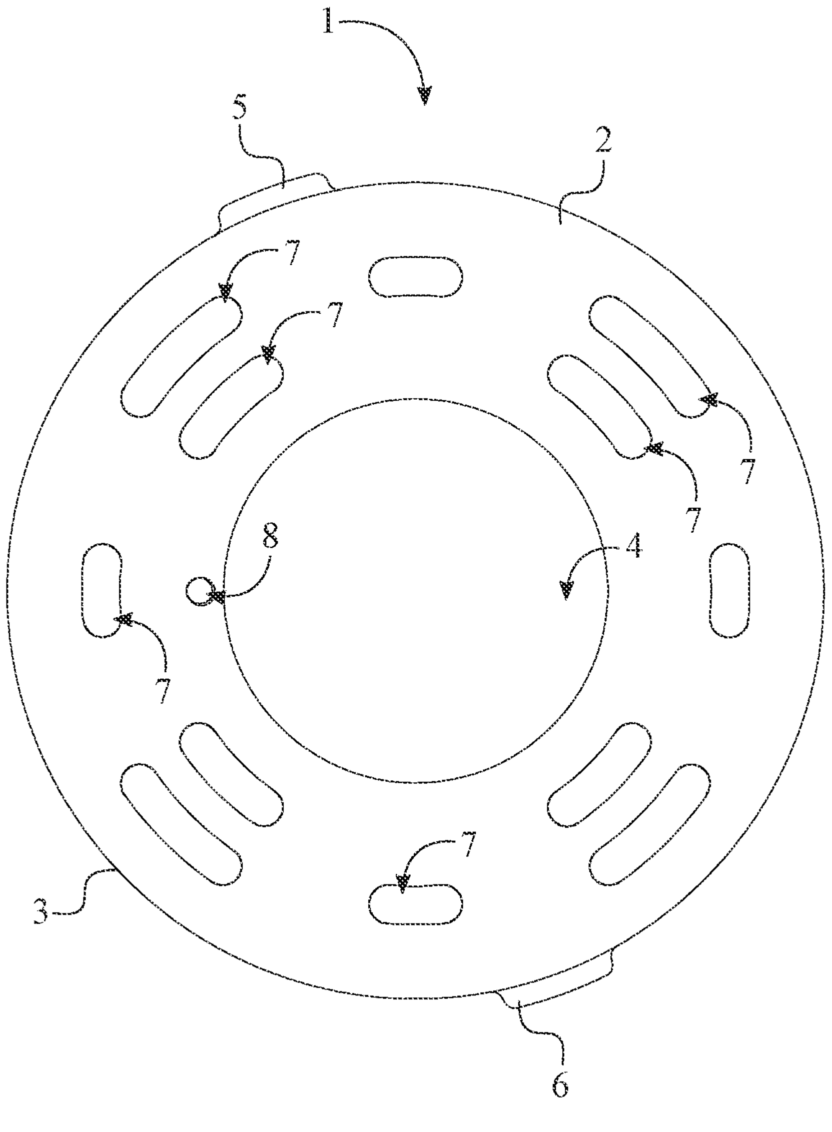
FIG. 4 is a top view of the mounting plate of the present invention.

In reference to FIG. 4, the mounting plate 1 further comprises a central opening 4. The central opening 4 allows the electrical wires to be pulled through the mounting plate 1 so that the electricians can electrically connect the lighting fixture. More specifically, the central opening 4 concentrically traverses through the plate body 2 thus allowing the electrical wires to be pulled through the center of the mounting plate 1.

In reference to FIG. 4, the mounting plate 1 further comprises a plurality of openings 7 and a ground wire connector 8. Each of the plurality of openings 7 is radially positioned around the central opening 4 and traverses through the plate body 2. Resultantly, the plurality of openings 7 is able to function as alignment openings so that the mounting plate 1 can be aligned and attached to the junction box. More specifically, the plurality of openings 7 is arranged in a circular pattern in such a way that the plurality of openings 7 is configured as two rows of openings in a circular pattern. The first row of openings is located closer to the central opening 4 whereas the second row of openings is located closer to the outer lateral surface 3 of the plate body 2. The plurality of openings 7 allows for the mounting plate 1 to be compatible with a variety of junction boxes currently on the market. The ground wire connector 8 is integrated into the plate body 2 so that the electrical power can be grounded to the junction box via the mounting plate 1. The ground wire connector 8 is preferably a threaded hole that can receive a threaded grounding screw. Even though the plurality of openings 7 is arranged in a circular pattern within the preferred embodiment, the plurality of openings 7 can also be arranged in a linear pattern and organic pattern without deviating from the scope of the functionality. Even though the plurality of openings 7 is configured as two rows within the preferred embodiment, the plurality of openings 7 can be configured into any number of rows without deviating from the scope of the functionality.

Figure 6:
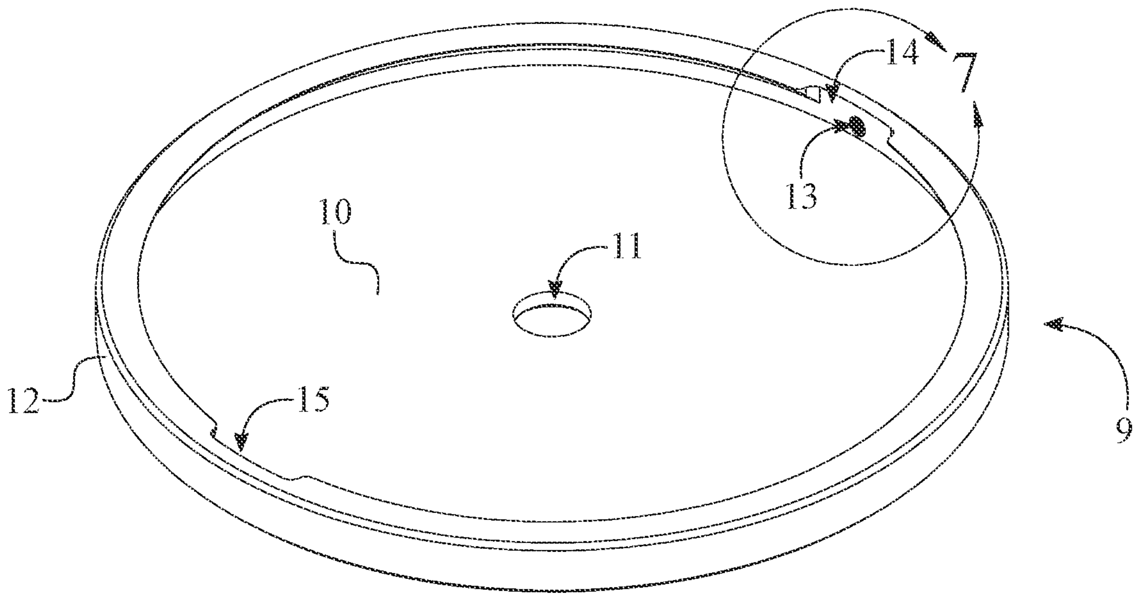
FIG. 6 is a top view of the canopy cover of the present invention, which a detailed view is taken shown FIG. 7.

In reference to FIG. 6, the canopy cover 9 further comprises at least one fixture-mounting opening 11. More specifically, the fixture-mounting opening 11 concentrically traverses through the cover body 10 thus allowing the light fixture to be mounted to the canopy cover 9. Even though the preferred embodiment is shown with one fixture-mounting opening 11, the present invention can have multiple fixture-mounting openings 11 without deviating from the scope of the functionality.

In reference to FIG. 6, the canopy cover 9 further comprises a first access gap 14 and a second access gap 15. The first access gap 14 traverses into the track channel 12, opposite of the cover body 10. The second access gap 15 traverses into the track channel 12, opposite of the cover body 10. Furthermore, the first access gap 14 is diametrically opposed to the second access gap 15 about the fixture-mounting opening 11. In other words, the first access gap 14 and the second access gap 15 function as channel openings so that the first wing 5 and the second wing 6 can be inserted into the track channel 12. Once the first wing 5 and the second wing 6 are inserted, the canopy cover 9 can be rotated about a central rotational axis of the canopy cover 9 to lock the first wing 5 within the track channel 12 and the second wing 6 within the track channel 12.

Figure 3:
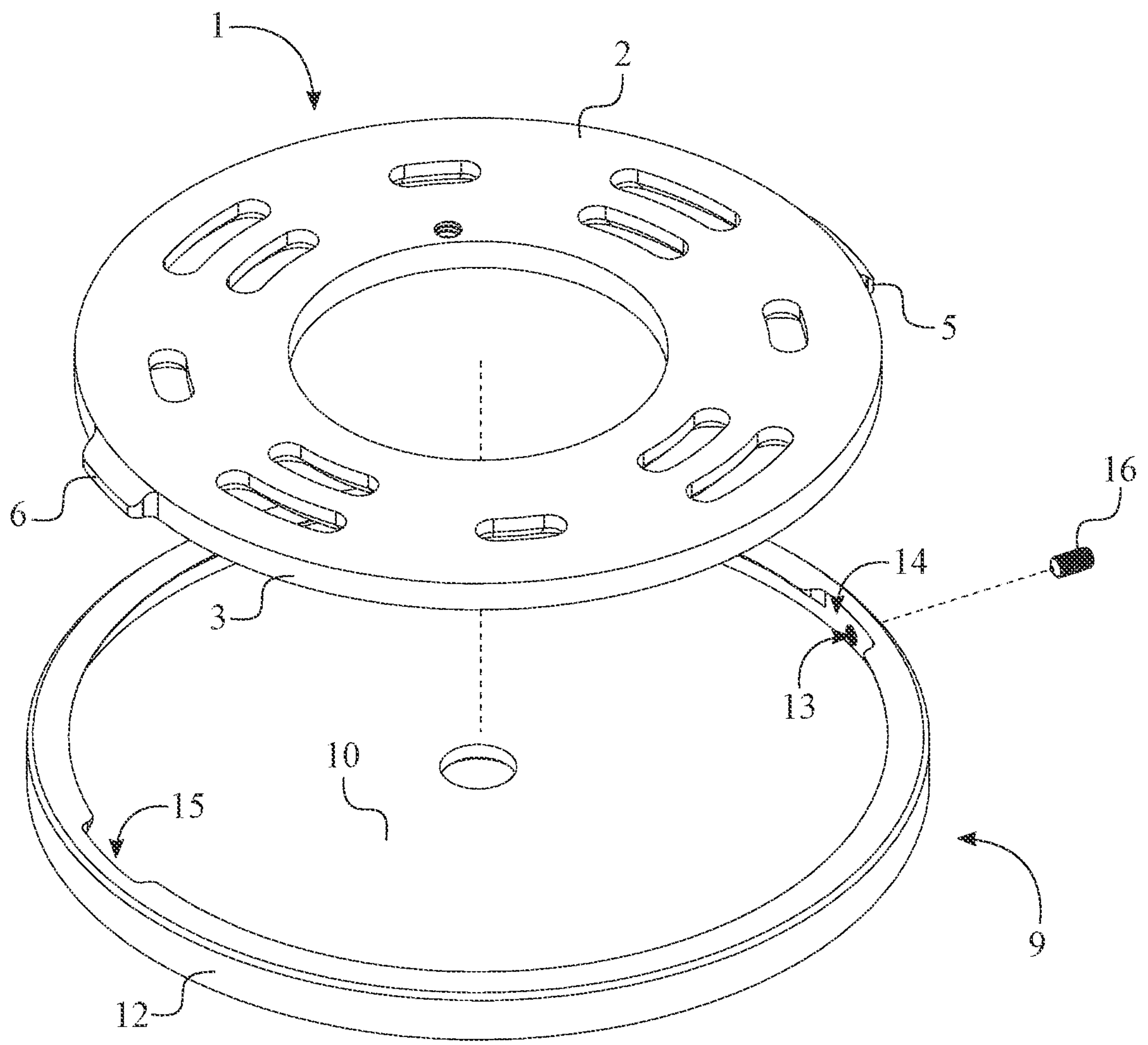
FIG. 3 is an exploded view of the present invention.
Figure 7:
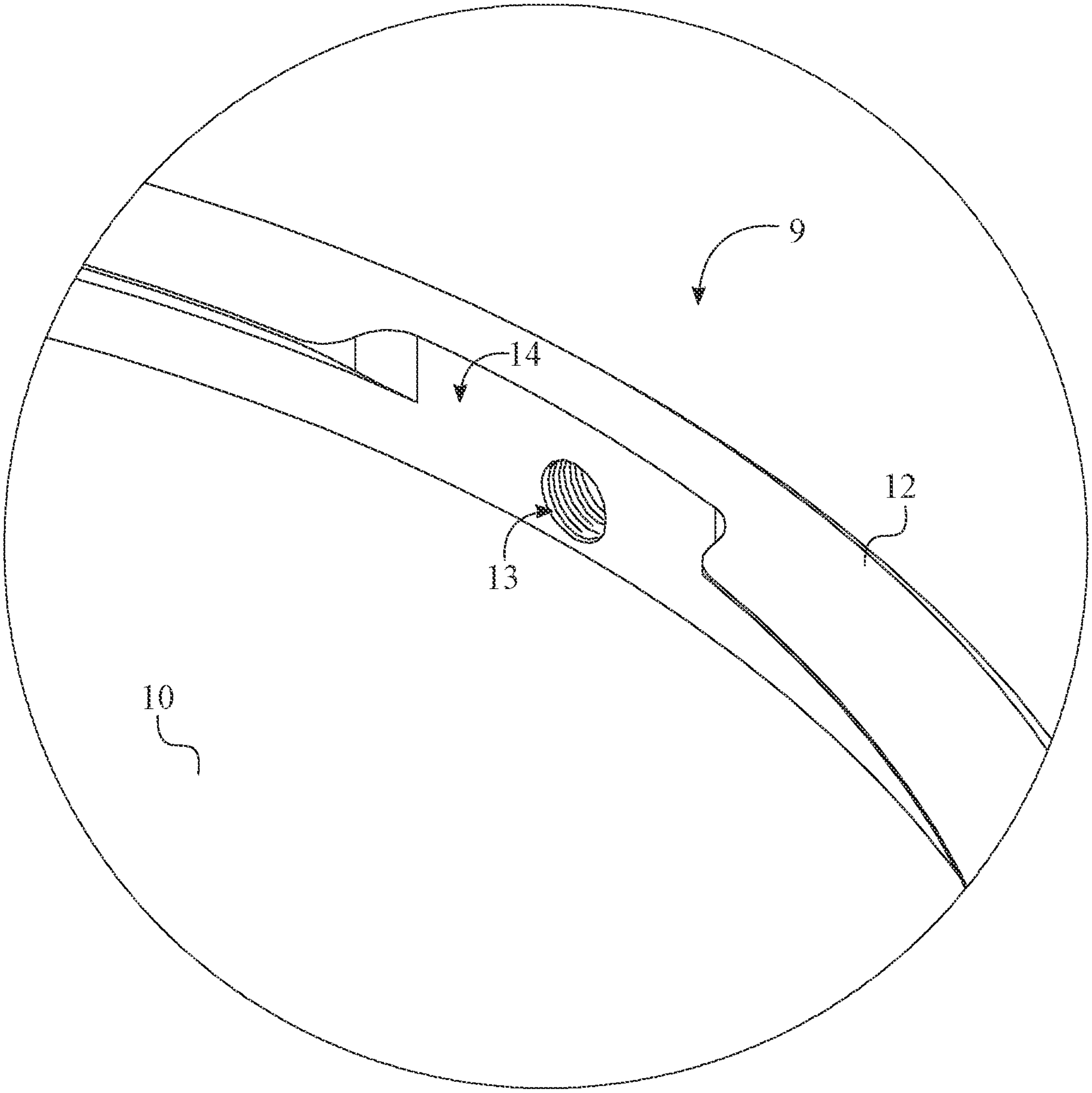
FIG. 7 is a top view of the canopy cover of the present invention showing the threaded opening.

In reference to FIG. 3 and FIG. 7, the present invention comprises a set screw 16 and a threaded opening 13. The set screw 16 and the threaded opening 13 function as a fastening mechanism to so that the canopy cover 9 can be mechanically fasten to the mounting plate 1. More specifically, the threaded opening 13 laterally traverses through the track channel 12. The set screw 16 is laterally engaged within the threaded opening 13 in such a way that the set screw 16 is terminally pressed against the outer lateral surface 3 of the plate body 2. As a result, the set screw 16 is able to lock the canopy cover 9 onto the mounting plate 1 thus preventing twisting and accidental dislodging. Even though the present invention preferably utilizes the set screw 16 to lock the canopy cover 9 onto the mounting plate 1, the present invention can use any other types of fasteners (such as a flat-head screw, a thumb screw, a spring, a nail, a locking pin, or any other knows fasteners) to lock the canopy cover 9 onto the mounting plate 1 without deviating from the scope of the functionality.

Although the invention has been explained in relation to its preferred embodiment, it is to be understood that many other possible modifications and variations can be made without departing from the spirit and scope of the invention as hereinafter claimed.

What is claimed is:

1. A twist-lock mounting system for lighting fixtures comprising:
- a mounting plate;
- a canopy cover;
- the mounting plate comprising a plate body, a first wing, and a second wing;
- the canopy cover comprising a cover body and a track channel;
- the first wing and the second wing being laterally connected to the plate body;
- the first wing being diametrically opposed to the second wing about the plate body;
- the track channel being perimetrically connected around the cover body;
- the first wing and the second wing being engaged within the track channel; and
- the plate body, the first wing, and the second wing being enclosed by the track channel and the cover body.

2. The twist-lock mounting system for lighting fixtures as claimed in claim 1 comprising:
- the mounting plate further comprising a central opening;
- the central opening concentrically traversing through the plate body;
- the first wing being outwardly connected to an outer lateral surface of the plate body; and
- the second wing being outwardly connected to the outer lateral surface of the plate body.

3. The twist-lock mounting system for lighting fixtures as claimed in claim 1 comprising:
- the mounting plate further comprising a central opening and a plurality of openings;
- each of the plurality of openings being radially positioned around the central opening; and
- each of the plurality of openings traversing through the plate body.

4. The twist-lock mounting system for lighting fixtures as claimed in claim 1 comprising:
- the mounting plate further comprising a ground wire connector; and
- the ground wire connector being integrated into the plate body.

5. The twist-lock mounting system for lighting fixtures as claimed in claim 1 comprising:
- the canopy cover further comprising at least one fixture-mounting opening; and
- the fixture-mounting opening concentrically traversing through the cover body.

6. The twist-lock mounting system for lighting fixtures as claimed in claim 1 comprising:
- the canopy cover further comprising at least one fixture-mounting opening, a first access gap, and a second access gap;
- the first access gap traversing into the track channel, opposite of the cover body;
- the second access gap traversing into the track channel, opposite of the cover body; and
- the first access gap being diametrically opposed to the second access gap about the fixture-mounting opening.

7. The twist-lock mounting system for lighting fixtures as claimed in claim 1 comprising:
- a set screw;
- a threaded opening;
- the threaded opening laterally traversing through the track channel;
- the set screw being laterally engaged within the threaded opening; and
- the set screw being terminally pressed against an outer lateral surface of the plate body.

8. A twist-lock mounting system for lighting fixtures comprising:
- a mounting plate;
- a canopy cover;

the mounting plate comprising a plate body, a first wing, and a second wing;

the canopy cover comprising a cover body, a track channel, and at least one fixture-mounting opening;

the first wing and the second wing being laterally connected to the plate body;

the first wing being diametrically opposed to the second wing about the plate body;

the track channel being perimetrically connected around the cover body;

the fixture-mounting opening concentrically traversing through the cover body;

the first wing and the second wing being engaged within the track channel; and the plate body, the first wing, and the second wing being enclosed by the track channel and the cover body.

9. The twist-lock mounting system for lighting fixtures as claimed in claim 8 comprising:

the mounting plate further comprising a central opening;

the central opening concentrically traversing through the plate body;

the first wing being outwardly connected to an outer lateral surface of the plate body; and the second wing being outwardly connected to the outer lateral surface of the plate body.

10. The twist-lock mounting system for lighting fixtures as claimed in claim 8 comprising:

the mounting plate further comprising a central opening and a plurality of openings;

each of the plurality of openings being radially positioned around the central opening; and each of the plurality of openings traversing through the plate body.

11. The twist-lock mounting system for lighting fixtures as claimed in claim 8 comprising:

the mounting plate further comprising a ground wire connector; and the ground wire connector being integrated into the plate body.

12. The twist-lock mounting system for lighting fixtures as claimed in claim 8 comprising:

the canopy cover further comprising at least one fixture-mounting opening, a first access gap, and a second access gap;

the first access gap traversing into the track channel, opposite of the cover body;

the second access gap traversing into the track channel, opposite of the cover body; and the first access gap being diametrically opposed to the second access gap about the fixture-mounting opening.

13. The twist-lock mounting system for lighting fixtures as claimed in claim 8 comprising:

a set screw;

a threaded opening;

the threaded opening laterally traversing through the track channel;

the set screw being laterally engaged within the threaded opening; and the set screw being terminally pressed against an outer lateral surface of the plate body.

14. A twist-lock mounting system for lighting fixtures comprising:

a mounting plate;

a canopy cover;

the mounting plate comprising a plate body, a first wing, and a second wing;

the canopy cover comprising a cover body, a track channel, at least one fixture-mounting opening, a first access gap, and a second access gap;

the first wing and the second wing being laterally connected to the plate body;

the first wing being diametrically opposed to the second wing about the plate body;

the track channel being perimetrically connected around the cover body;

the fixture-mounting opening concentrically traversing through the cover body;

the first access gap traversing into the track channel, opposite of the cover body;

the second access gap traversing into the track channel, opposite of the cover body;

the first access gap being diametrically opposed to the second access gap about the fixture-mounting opening;

the first wing and the second wing being engaged within the track channel; and the plate body, the first wing, and the second wing being enclosed by the track channel and the cover body.

15. The twist-lock mounting system for lighting fixtures as claimed in claim 14 comprising:

the mounting plate further comprising a central opening;

the central opening concentrically traversing through the plate body;

the first wing being outwardly connected to an outer lateral surface of the plate body; and the second wing being outwardly connected to the outer lateral surface of the plate body.

16. The twist-lock mounting system for lighting fixtures as claimed in claim 14 comprising:

the mounting plate further comprising a central opening and a plurality of openings;

each of the plurality of openings being radially positioned around the central opening; and each of the plurality of openings traversing through the plate body.

17. The twist-lock mounting system for lighting fixtures as claimed in claim 14 comprising:

the mounting plate further comprising a ground wire connector; and the ground wire connector being integrated into the plate body.

18. The twist-lock mounting system for lighting fixtures as claimed in claim 14 comprising:

a set screw;

a threaded opening;

the threaded opening laterally traversing through the track channel;

the set screw being laterally engaged within the threaded opening; and the set screw being terminally pressed against an outer lateral surface of the plate body.

* * * * *